US008474355B2

(12) United States Patent
Finck

(10) Patent No.: US 8,474,355 B2
(45) Date of Patent: Jul. 2, 2013

(54) VEHICLE GLAZING PANEL CUT OUT

(75) Inventor: William Finck, Brentwood (GB)

(73) Assignee: Belron Hungary KFT—Zug Branch, Zug (CH)

( * ) Notice: Subject to any disclaimer, the term of this patent is extended or adjusted under 35 U.S.C. 154(b) by 394 days.

(21) Appl. No.: 12/345,977

(22) Filed: Dec. 30, 2008

(65) Prior Publication Data

US 2010/0139471 A1 Jun. 10, 2010

(30) Foreign Application Priority Data

Dec. 8, 2008 (GB) .................................. 0822316.6

(51) Int. Cl.
*B26D 1/48* (2006.01)
*B60J 1/02* (2006.01)
*B26B 27/00* (2006.01)

(52) U.S. Cl.
USPC .................. 83/39; 83/200.1; 30/116; 30/317; 30/372; 29/402.03

(58) Field of Classification Search
USPC ........... 30/116, 272.1, 314, 317, 372; 83/614, 83/743–745, 327, 373, 200.1; 29/281.1, 402.03, 29/402.08; 156/344, 94, 98, 584
See application file for complete search history.

(56) References Cited

U.S. PATENT DOCUMENTS

| | | | | |
|---|---|---|---|---|
| 5,139,210 | A * | 8/1992 | Schaffer | 242/129 |
| 6,591,502 | B1 | 7/2003 | Gmeilbauer | |
| 6,616,800 | B2 | 9/2003 | Eriksson | |
| 2006/0117573 | A1* | 6/2006 | Jensen et al. | 30/286 |
| 2007/0000361 | A1* | 1/2007 | Ericson | 83/13 |
| 2007/0040415 | A1* | 2/2007 | Ericson | 296/201 |
| 2007/0214649 | A1* | 9/2007 | Hess | 30/116 |
| 2010/0132882 | A1* | 6/2010 | Hess et al. | 156/250 |

FOREIGN PATENT DOCUMENTS

| | | | |
|---|---|---|---|
| CA | 2034221 | | 7/1991 |
| DE | 4012207 | | 10/1991 |
| DE | 202005015702 | U1 | 1/2006 |
| EP | 0093283 | | 9/1983 |
| GB | 2084918 | | 4/1982 |
| WO | WO86/07017 | | 12/1986 |
| WO | WO98/58779 | | 12/1998 |
| WO | WO2004014678 | | 2/2004 |
| WO | WO2004103747 | * | 2/2004 |
| WO | WO2006/030212 | | 3/2006 |

* cited by examiner

*Primary Examiner* — Laura M. Lee
(74) *Attorney, Agent, or Firm* — Gordon & Jacobson, PC

(57) ABSTRACT

A glazing panel cut out system for use with a cutting wire in cutting out a vehicle glazing panel cut out procedure has a dispenser unit for dispensing cutting wire and a winder unit for winding the wire, both being mounted to the glazing panel during use. The winder unit has one or more winder spools for winding the cutting wire dispensed from the dispenser. The cutting wire is paid out from the dispenser whilst mounted to the glazing panel during the cut out procedure.

13 Claims, 2 Drawing Sheets

VEHICLE GLAZING PANEL CUT OUT

CROSS-REFERENCE TO RELATED APPLICATION

This application claims priority from United Kingdom Patent Application No. GB0822316.6, filed on Dec. 8, 2008, which is hereby incorporated herein by reference in its entirety.

BACKGROUND OF THE INVENTION

1. Field of the Invention

The present invention relates to a vehicle glazing panel cut out technique.

2. Background of the Invention

Vehicle glazing panels such as vehicle windscreens (windshields) are typically bonded in supporting frames by adhesive bonding material such as polyurethane, applied in a continuous bead about the periphery of the glazing panel and frame.

Wire cutting techniques have been previously proposed and used to effect glazing panel removal (for replacement or otherwise). Exemplary techniques are disclosed in, for example, EP-A-0093283, Canadian Patent Specification 2034221, U.S. Pat. No. 6,616,800, German Patent 4012207 and PCT Publications WO2006/030212, WO86/07017 and WO98/58779. In particular WO2006/030212 discloses a technique in which during cutting the wire can be operated in certain circumstances to slip or slide with respect to the bonding material in order to saw or cut through the bonding material. This has proved advantageous.

An improved technique and apparatus has now been devised.

SUMMARY OF THE INVENTION

According to a first aspect, the present invention provides a glazing panel cut out system for use with a cutting wire in cutting out a vehicle glazing panel cut out procedure, the system including:

- a dispenser unit for dispensing cutting wire the dispenser having means for mounting to the glazing panel and enabling cutting wire to be payed out from the dispenser whilst mounted to the glazing panel during the cut out procedure; and;
- a winder unit including;
  - a mounting arrangement for mounting the winder unit on the glazing panel;
  - at least one winder spool for winding cutting wire dispensed from the dispenser.

According to a second aspect, the invention provides a method of cut out of a vehicle glazing panel bonded in a frame by means of interposed bonding material, the method comprising:

- setting a wire winder unit on the windscreen, the winder unit including one or more winder spools;
- setting a wire dispenser unit on the windscreen, looping the cutting wire about the periphery of the glazing panel and connecting a free end of the wire payed out from the dispenser to the winder spool of the winder unit;
- operating the winder spool of the winder unit to wind the wire and thereby cut the bonding material, wherein during cutting wire is payed out from the dispenser unit to effect slip cutting of the bonding material.

According to either aspect, the present invention provides advantages over the prior art because the use of a wire spool dispenser provides the benefit of enabling 'slip cutting' to be achieved whilst ensuring that the second free end of the wire need only be cut when the overall required wire length is known following cut out of a large proportion of the windscreen.

In one realisation of the method, it is preferred that he dispenser unit and the winder unit are mounted on opposed surfaces of the glazing panel.

According to the method, following operation of the winder unit to cut out a portion of the glazing panel, a length of wire may be paid out of the dispenser unit and cut to form a further free end, the further free end then being connected to a winder spool of the winder unit, which spool is then wound to effect cutting out of a further portion of the glazing panel.

In a preferred realisation of the invention, the wire paid out from the dispenser unit passes via a brake or drag device to inhibit or hinder paying out of the wire from the dispenser unit. The brake or dag device may be a patch of adhesive tape secured to the glazing panel overlaying a length of the wire extending from the dispenser unit.

In a preferred realisation of the invention, the winder unit includes first and second winder spools for winding the cutting wire. Beneficially in such an arrangement, the respective free ends of the wire are attached to different respective winder spools of the winder unit.

The winder unit may in a preferred embodiment include at least one wire wrap around guide element spaced from the winder spool and/or the mounting means, preferably comprising a guide wheel or pulley rotatably mounted with respect to the winder unit. This is not an essential feature for all envisaged embodiments, but does enable smoother winding of the wire and reduce the risk of wire breakage.

In one embodiment, the wire dispenser unit includes a rotatable spool for paying out the wire. Beneficially, the mounting means for the dispenser unit comprises a suction mount. The dispenser unit is preferably capable of being mounted on a central zone of the glazing panel.

In a preferred embodiment of a winder unit, two winder spools are arranged in side by side arrangement, a respective wire guide wheel or pulley being positioned outwardly of each respective winder spools.

The winder spool may include a ratchet arrangement enabling spool rotation in one or other direction to be inhibited.

The invention will now be further described in a specific embodiment by way of example only and with reference to the accompanying drawings.

DETAILED DESCRIPTION OF THE PREFERRED EMBODIMENT

Figure 1:
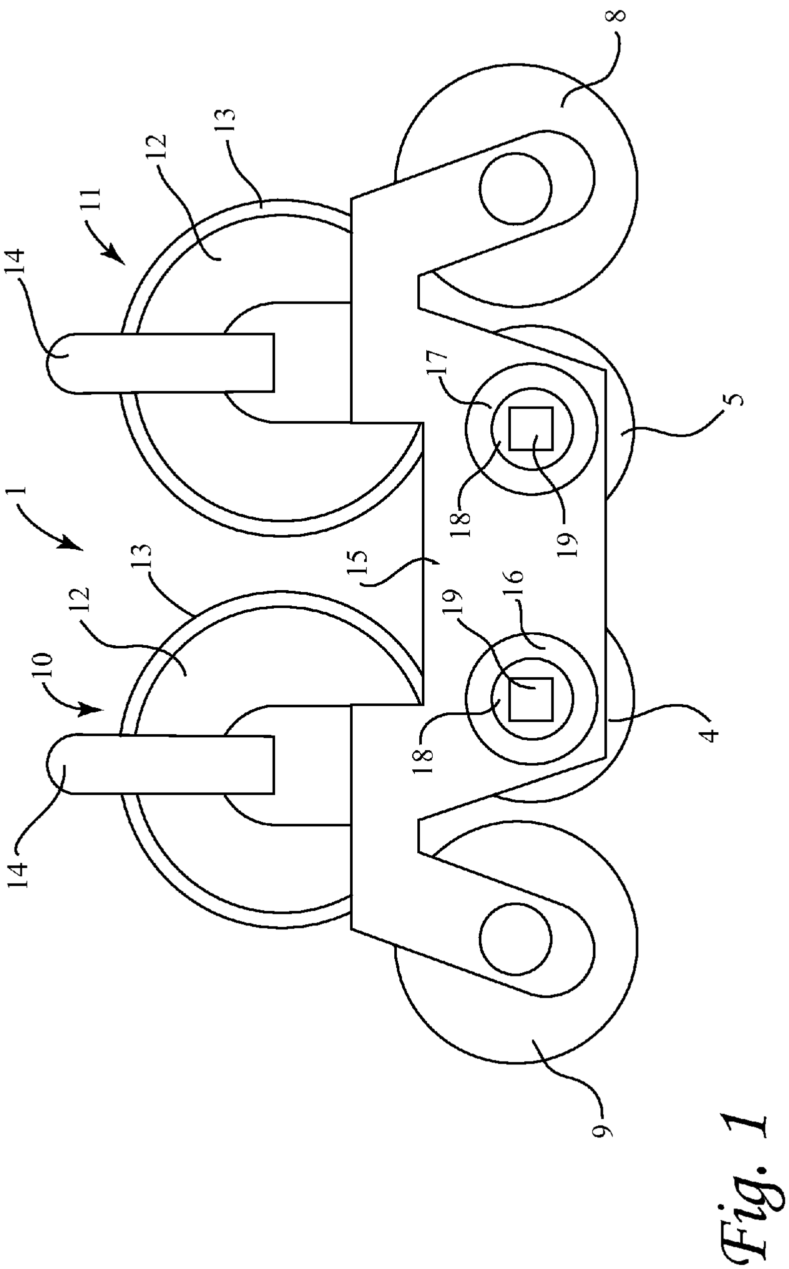
FIG. 1 is a schematic plan view of a winder unit of an exemplary cut out system in accordance with the invention.

Referring to the drawings, and initially to FIGS. 1 to 4, there is shown a cut out system particularly for use in cut out of bonded vehicle glazing panels such as windscreens. The cut out system comprises a winder unit 1 and a wire dispenser unit 2.

The winder unit 1 comprises a pair of releasable suction cup mounts 10, 11 enabling the winder unit to be releasably secured to the windscreen. The suction cup mounts comprise a rigid plastics cup 12 and underlaying flexible rubber skirt membrane 13. Respective actuation/release levers 14 enable consistent suction to be applied and released. Such suction mounts are commonly employed in windscreen replacement and repair technology. The suction cup mounts 10, 11 are pivotably/tiltably mounted to the support bracket 15 of the winder unit to ensure that both mounts 10, 11 can locate in good engagement with the windscreen despite the curvature of the windscreen. The main body of the support bracket 15 carries a pair of underslung winding spools 4, 5 in side by side relationship. The spools are connected to axial winding shafts which are supported in bearings 16, 17 provided on the winder unit. The spools 4, 5 are driven axially rotationally either manually via a hand winder or by means of a mechanical actuator such as a motorised winding or winching tool.

Drive bosses 18 are provided with female sockets 19 (square bores) for receiving the male driving tool. Positioned outwardly of the winding spools are respective wire guide pulley wheels 8, 9 of low friction plastics material. The pulley wheels are mounted to be rotatable about respective rotational axes. The guide pulleys rotate as the cutting wire is drawn tangentially across the pulleys as will be described. The winder spools 4, 5 are held to rotate in one direction only (each in opposite senses) by respective ratchet mechanisms. Each mechanism includes ratchet override permitting prior tightened wire to be slackened, or unwound (reverse wound).

A prior art technique is disclosed in WO2006/030212 and in particular, in the technique shown in FIGS. 9 and 10 of that disclosure, the glazing panel is removed using a wire 41 and the winder unit 1, which is initially secured to the steering wheel side of the glazing panel, positioned above the steering wheel as shown in FIG. 9. With the winder unit and guide arrangement in position as described, the cutting wire is looped around the outside of the windscreen to lie peripherally adjacent the bonding bead which is sandwiched between the glazing panel and the support frame of the vehicle. Opposed ends of the cutting wire are fed through a pierced channel made through the bonding bead in the corner of the windscreen (x) below the position of the winder unit 1.

A length 41 of the wire is pulled through to the interior of the vehicle and passed around pulley wheel 9 of the winder unit and connected for winding to the winder spool 5 of the winder unit. A free end length of wire 47 is pulled through, being of length sufficient to reach the upper left hand corner of the glazing panel. Winder spool 5 is then operated to cause the wire length 41 to cut through the bonding bead upwardly along the side of the windscreen, until the cut line has passed around the upper right hand corner of the screen. At this juncture, the unit 1 is removed from the screen and repositioned on the glazing panel in the upper left hand corner as shown in FIG. 10. Prior to repositioning the unit 1, the ratchet of winder spool 5 is released to permit the wire to be wound out from the spool as it is moved across the glazing panel to be repositioned. The ratchet is subsequently re-engaged and spool 5 once again operated to wind in the wire from the position shown in FIG. 10 until it reaches the position shown in the dashed line in FIG. 10.

Next the unit 1 is moved around the corner of the glazing panel and through substantially a right angle, to the position shown in FIG. 11, where it is secured to the glazing panel. In order to enable this to be achieved, the ratchet of spool 5 is again released and subsequently re-engaged when the unit is in position as shown in FIG. 11. The end of the free length of wire 47 is then wound around pulley 8 and connected to winder spool 4 and the spools 4 and 5 operated either sequentially (or simultaneously)to complete the cut. As shown in FIG. 11. The lengths of wire cross at Z in order to complete the cut.

Figure 2:
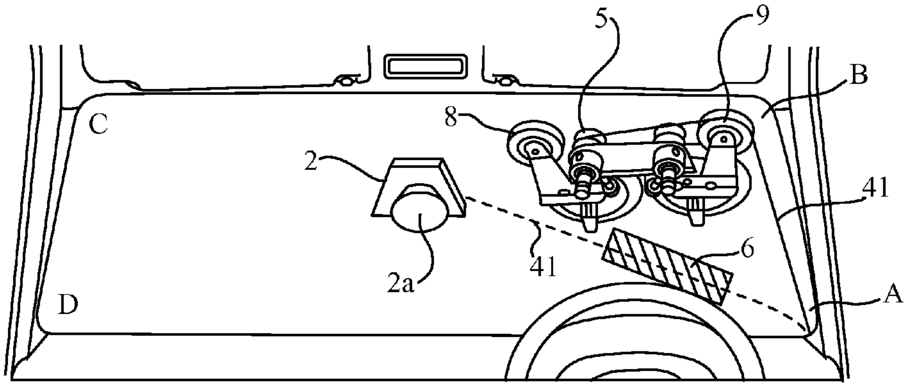
FIGS. 2 to 4 are schematic representations in sequence of a cut out technique in accordance with the invention.
Figure 3:
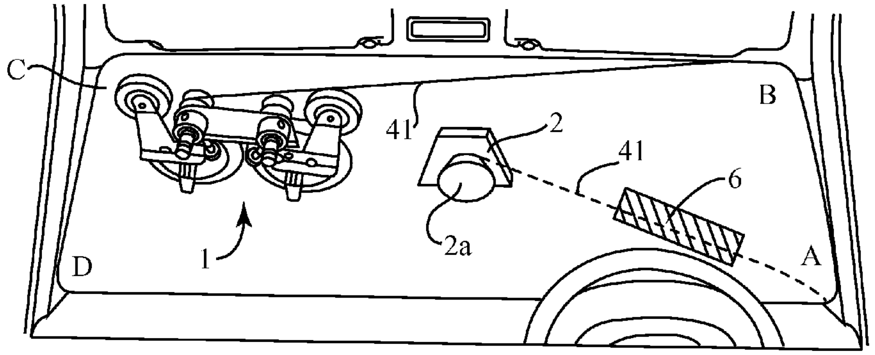

In accordance with the present invention the winder unit 1 is secured internally of the vehicle to the surface of the glazing panel 3 above the steering wheel as shown in FIG. 2. A wire dispenser spool 2 is secured to the exterior surface of the glazing panel 3 and the wire 41 is wrapped around the external peripheral edge of the glazing panel staring at corner A and proceeding to corners B C and D. The wire subsequently passes adjacent the lowermost edge of the screen (from D toward A) where a free end is pulled through an aperture made in the PU bonding bead at the corner A, such that the free end of the wire can be attached to winder spool 5. An adhesive tape patch 6 is secured to the screen over the wire. The dispenser spool 2 includes a sucker mount **2*a* and an internal wire dispenser cartridge which is free to rotate in a housing so as to pay out wire from the dispenser spool as tension of a required magnitude is put upon the wire. The adhesive tape patch is used to give resistance to paying out of the wire from the spool. Other brake devices (typically resistance or friction providing devices may be used in addition to or as an alternative to the adhesive patch 6**).

Removal is commenced by winding the spool 5 to move the cut from the corner A upwardly along the side edge and around corner B. During cutting, if excessive resistance occurs, from tough or large PU adhesive beads, the wire is able to spool off the dispenser spool 2 and slip and slice past the PU adhesive. The use of the spool dispenser mounted on the windscreen enables this ‘slip cutting’ to occur early in the cut out procedure and without pre cutting of the other free end of the wire 41. Once the cutting wire 40 has travelled around the corner B, the winder unit 1 is moved across the windscreen to the other side and re-secured to the windscreen in the configuration shown in FIG. 3. Prior to repositioning the unit 1, the ratchet of winder spool 5 is released to permit the wire to be wound out from the spool 5 as it is moved across the glazing panel to be repositioned. The ratchet is subsequently re-engaged and spool 5 once again operated to wind in the wire.

Figure 4:
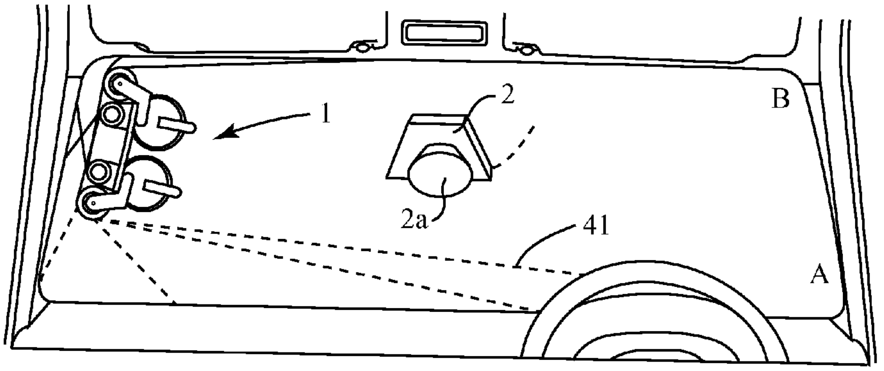

When the cut has almost been completed along the top edge, the winder unit is rotated through 90 degrees and re-secured as shown in FIG. 4. The cut is then progressed such that the cut position passes around the corner C. The adhesive tape 6 is next removed and enough wire is payed out from the dispenser spool 2 to reach and be wound on the winder spool. The measured length of wire is then cut from the dispenser spool and the cut free end is pulled into the vehicle either by prising out the already released corner of the windscreen to form a small gap, or insertion of the free wire end through the pre-formed hole in the PU bonding material at corner A. The free end of the wire 41 is then connected to the spool 4 (passing around pulley 8). The winder spool 4 is then operated to wind in the wire, in so doing cutting along the bottom edge.

The present invention provides the benefits of wire cutting systems without over complex system apparatus arrangements or the need to re configure the apparatus significantly following initial set up. The technique can be used by operators of relatively little experience or physical strength following an initial set up routine of minimal complexity.

The use of a wire spool dispenser provides the benefit of enabling ‘slip cutting’ to be achieved whilst ensuring that the second free end of the wire need only be cut when the overall required wire length is known following cut out of a large proportion of the windscreen.

The invention claimed is:

1. A method of cutting out a vehicle glazing panel bonded in a frame by means of interposed bonding material, the vehicle glazing panel having a first surface disposed opposite a second surface, the method comprising:

providing a wire winder unit separate from a wire dispenser unit and movable relative to the wire dispenser unit, wherein the wire winder unit includes at least one winder spool, and wherein the wire dispenser unit includes a rotatable spool for paying out cutting wire therefrom in response to tension applied to the cutting wire;

releasably securing the wire winder unit in a first position on the first surface of the vehicle glazing panel, wherein the wire winder unit engages the first surface of the vehicle glazing panel;

releasably securing the wire dispenser unit in a second position on the second surface of the vehicle glazing panel, wherein the wire dispenser unit engages the second surface of the vehicle glazing panel;

paying out cutting wire from the rotatable spool of the wire dispensing unit and looping the cutting wire paid out from the wire dispenser unit about the periphery of the vehicle glazing panel;

connecting a free end of the cutting wire paid out from the wire dispenser unit to the at least one winder spool of the wire winder unit; and with the wire dispenser unit secured in the second position on the second surface of the vehicle glazing panel and the cutting wire extending from the wire dispenser unit to the wire winder unit secured in the first position on the first surface of the vehicle glazing panel, operating the at least one winder spool of the wire winder unit to wind the cutting wire and cut the bonding material with the cutting wire, wherein during cutting the cutting wire is paid out from the rotatable spool of the wire dispenser unit to effect slip cutting of the bonding material disposed about the frame with the cutting wire.

2. A method according to claim 1, further comprising:

following operation of the wire winder unit to cut out a portion of the bonding material disposed about the frame of the vehicle glazing panel, cutting the cutting wire extending from the wire dispenser unit to provide a further free end of the cutting wire; and connecting the further free end of the cutting wire to the at least one winder spool of the wire winder unit, and winding the at least one winder spool to effect cutting out of a further portion of the bonding material disposed about the frame of the vehicle glazing panel with the cutting wire.

3. A method according to claim 1, further comprising:

passing the cutting wire paid out from the wire dispenser unit to a brake or drag device to inhibit paying out of the cutting wire from the wire dispenser unit.

4. A method according to claim 2, wherein:

the free end and the further free end of the cutting wire are attached to different respective winder spools of the wire winder unit.

5. A method according to claim 1, wherein:

the wire winder unit has a suction mount that is used to releasably secure the dispenser unit in the first position on the first surface of the vehicle glazing panel; and the wire dispenser unit has a suction mount that is used to releasably secure the dispenser unit in the second position on the second surface of the vehicle glazing panel.

6. A method according to claim 5, wherein:

the wire winder unit further includes at least one wire wrap around guide element spaced from at least one of the winder spool and the suction mount of the wire winder unit.

7. A method according to claim 6, wherein:

the wrap around guide element comprises a guide wheel or pulley rotatably mounted with respect to the winder unit.

8. A method according to claim 1, wherein:

the at least one winder spool of the wire winder unit includes first and second winder spools for winding the cutting wire which is dispensed from the wire dispenser unit.

9. A method according to claim 8, wherein:

the first and second winder spools are arranged in side by side arrangement; and the wire winder unit further first and second wire guide wheels or pulleys positioned outwardly of the respective first and second winder spools.

10. A method according to claim 1, wherein:

the at least one winder spool of the wire winder unit includes a ratchet arrangement enabling inhibition of spool rotation in at least one direction.

11. A method according to claim 1, wherein:

the first surface of the vehicle glazing panel is an interior surface, and the second surface of the vehicle glazing panel is an exterior surface.

12. A method according to claim 1, wherein:

the paying out of cutting wire from the rotatable spool of the wire dispensing unit and the looping of the cutting wire paid out from the wire dispenser unit about the periphery of the vehicle glazing panel is carried out with the wire dispensing unit secured in the in the second position on the second surface of the vehicle glazing panel.

13. A method according to claim 1, wherein:

the slip cutting of the bonding material disposed about the frame is carried out without cutting the other end of the cutting wire.

* * * * *